(12) United States Patent
Cheng et al.

(10) Patent No.: US 7,748,795 B2
(45) Date of Patent: Jul. 6, 2010

(54) FOLDABLE FRAME AND A COMPUTER HOUSING INCLUDING THE FOLDABLE FRAME

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 366 days.

(21) Appl. No.: 11/800,886

(22) Filed: May 7, 2007

(65) Prior Publication Data

US 2008/0001508 A1 Jan. 3, 2008

(30) Foreign Application Priority Data

Jun. 30, 2006 (TW) .............................. 95211541 U (51) Int. Cl.
*A47B 43/00* (2006.01)
(52) U.S. Cl. .................................... 312/223.2; 312/258
(58) Field of Classification Search .................... 312/5, 312/6, 257.1, 258, 259, 223.1, 223.2, 265.5; 220/6, 4.01, 4.02, 4.28, 4.22, 4.23, 4.24, 220/9.2; 174/50, 66; 361/679.01, 679.02, 361/679.6, 724, 752; 217/12 R, 14, 15
See application file for complete search history.

(56) References Cited

U.S. PATENT DOCUMENTS

| 770,138 | A | * | 9/1904 | Williams | 217/14 |
| 1,255,407 | A | * | 2/1918 | Goetz | 312/6 |
| 2,360,452 | A | * | 10/1944 | Stone | 312/259 |
| 3,254,786 | A | * | 6/1966 | Melville | 220/6 |
| 3,829,190 | A | * | 8/1974 | Jackson | 312/258 |
| 4,243,282 | A | * | 1/1981 | Densen | 312/259 |
| 5,713,647 | A | * | 2/1998 | Kim | 312/223.2 |
| 6,000,767 | A | * | 12/1999 | Liu et al. | 312/223.2 |
| 6,870,739 | B2 | * | 3/2005 | Groos et al. | 361/725 |
| 7,518,866 | B2 | * | 4/2009 | Cheng et al. | 361/697 |
| 2004/0201333 | A1 | * | 10/2004 | Chen | 312/223.2 |

* cited by examiner

*Primary Examiner*—James O Hansen
(74) *Attorney, Agent, or Firm*—Townsend and Townsend and Crew, LLP (57) ABSTRACT

A computer housing includes a foldable frame and a face panel. The frame is disposed for mounting a motherboard, an optical disk drive, and a power supply, and includes two first housing panels and two second housing panels that are connected pivotally and surroundingly as a whole. The frame is foldable into a folded state, where the first and second housing panels are turned pivotally to be proximate to each other so as to reduce the size of the frame, as well as the space and material required for packaging the frame, thereby saving costs of transport and packaging material.

6 Claims, 7 Drawing Sheets

FOLDABLE FRAME AND A COMPUTER HOUSING INCLUDING THE FOLDABLE FRAME

CROSS-REFERENCE TO RELATED APPLICATION

This application claims priority of Taiwanese Application No. 095211541, filed on Jun. 30, 2006, the disclosure of which is incorporated herein by reference.

BACKGROUND OF THE INVENTION

1. Field of the Invention

The invention relates to a computer housing, more particularly a computer housing having a foldable frame.

2. Description of the Related Art

Figure 1:
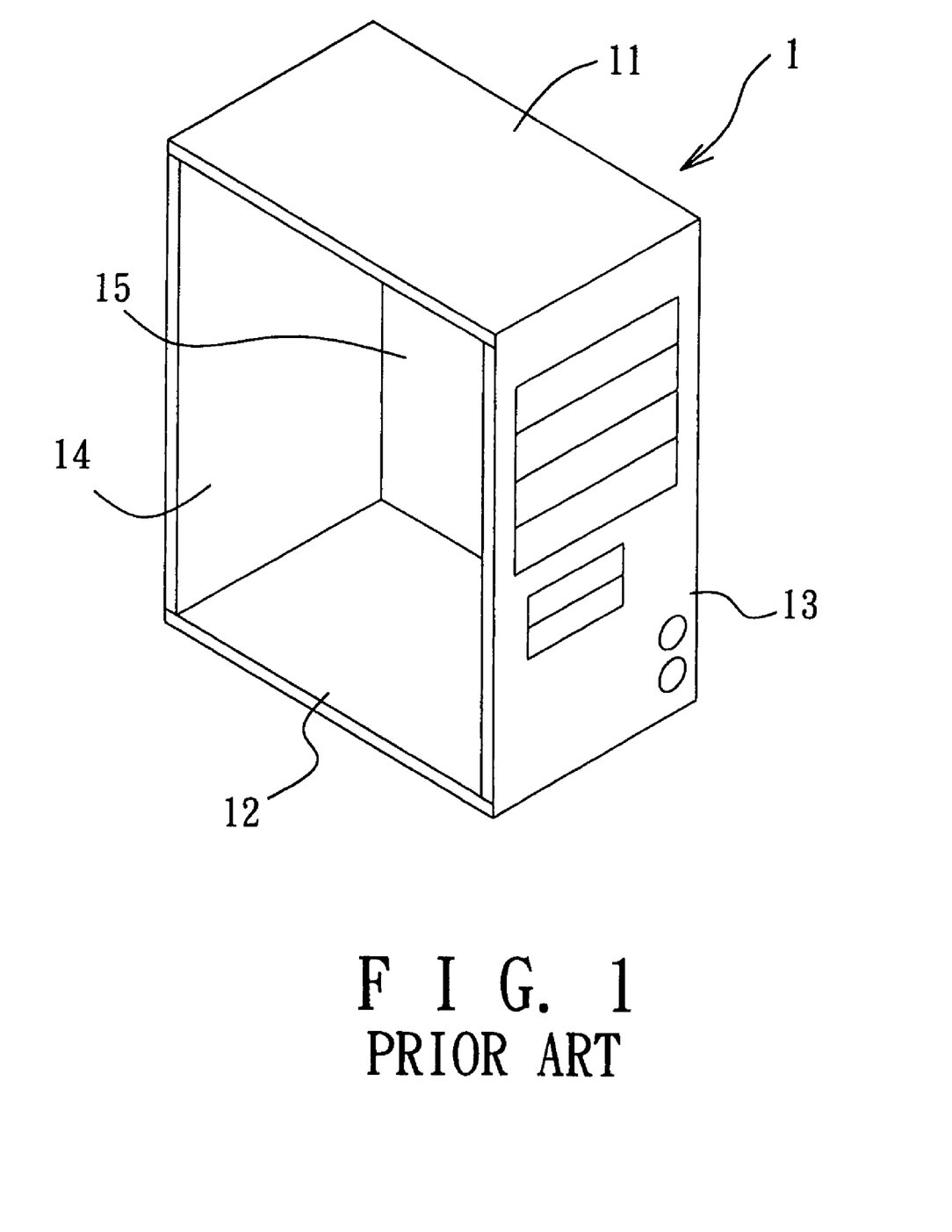
FIG. 1 is a perspective view to illustrate a conventional computer housing having a rectangular frame with a fixed structure.

Referring to FIG. 1, a conventional computer housing 1 generally includes a top frame panel 11, a bottom frame panel 12, and a front frame panel 13 and a rear frame panel 14 interconnecting front and rear panel edges of the top and bottom frame panels 11, 12. The four frame panels 11, 12, 13, 14 are interconnected to form a rectangular frame. The computer housing 1 further includes a lateral frame panel 15 for securing a motherboard (not shown). Since the aforesaid frame panels are generally secured in place by riveting, the structure of the rectangular frame is usually fixed and cannot be disassembled or folded. Such an arrangement can maintain the sturdiness of the structure of the housing, and the user does not need to perform any assembling operation after purchase.

However, a drawback of the computer housing 1 is that, since the size and structure of the housing are fixed, a corresponding storage space is required during transport or displaying of the housing. Relatively, the necessary transport cost is constantly kept at a certain level and cannot be reduced.

In an era of keen competitions and low profit margins, it is hoped that the costs involved with the production of products can be cut down in every aspect, so that the obtainable profits can be relatively increased.

SUMMARY OF THE INVENTION

Therefore, the object of the present invention is to provide a foldable frame for a computer housing, the frame being foldable to reduce space occupied thereby during transport or when displayed for sale.

Another object of the present invention is to provide a computer housing, which has a foldable frame that can reduce the space occupied by the computer housing during transport or when displayed for sale.

Accordingly, the foldable frame for a computer housing of the present invention includes two first housing panels and two second housing panels that are connected pivotally and surroundingly as a whole. The two first housing panels are parallel to each other, and the two second housing panels are parallel to each other. The frame is convertible between an assembled state and a folded state. In the assembled state, the first housing panels and the second housing panels are perpendicular to each other so as to form a rectangular frame for mounting a motherboard, an optical disk drive, and a power supply in the frame. In the folded state, one of the first housing panels is pivoted to be proximate to one of the second housing panels, while the other of the first housing panels is pivoted to be proximate to the other of the second housing panels.

The computer housing of the present invention includes a frame, a face panel, and two side panels. The frame includes two first housing panels and two second housing panels that are interconnected pivotally and surroundingly as a whole. The two first housing panels are parallel to each other, and the two second housing panels are parallel to each other. The frame is convertible between an assembled state and a folded state. In the assembled state, the first housing panels and the second housing panels are perpendicular to each other so as to form a rectangular frame for mounting a motherboard, an optical disk drive, and a power supply in the frame. In the folded state, one of the first housing panels is pivoted to be proximate to one of the second housing panels, while the other of the first housing panels is pivoted to be proximate to the other of the second housing panels. The face panel is disposed on a front side of the frame, and has a switch button. The two side panels are disposed on two sides of the frame, respectively.

Since the size of the frame in the folded state is comparatively reduced than in the assembled state, the cost of transport and the cost of packaging material for the frame can be reduced. Besides, the frame can be converted from the folded state to the assembled state with simple operations. Thus, the foldable frame also facilitates assembly.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 2:
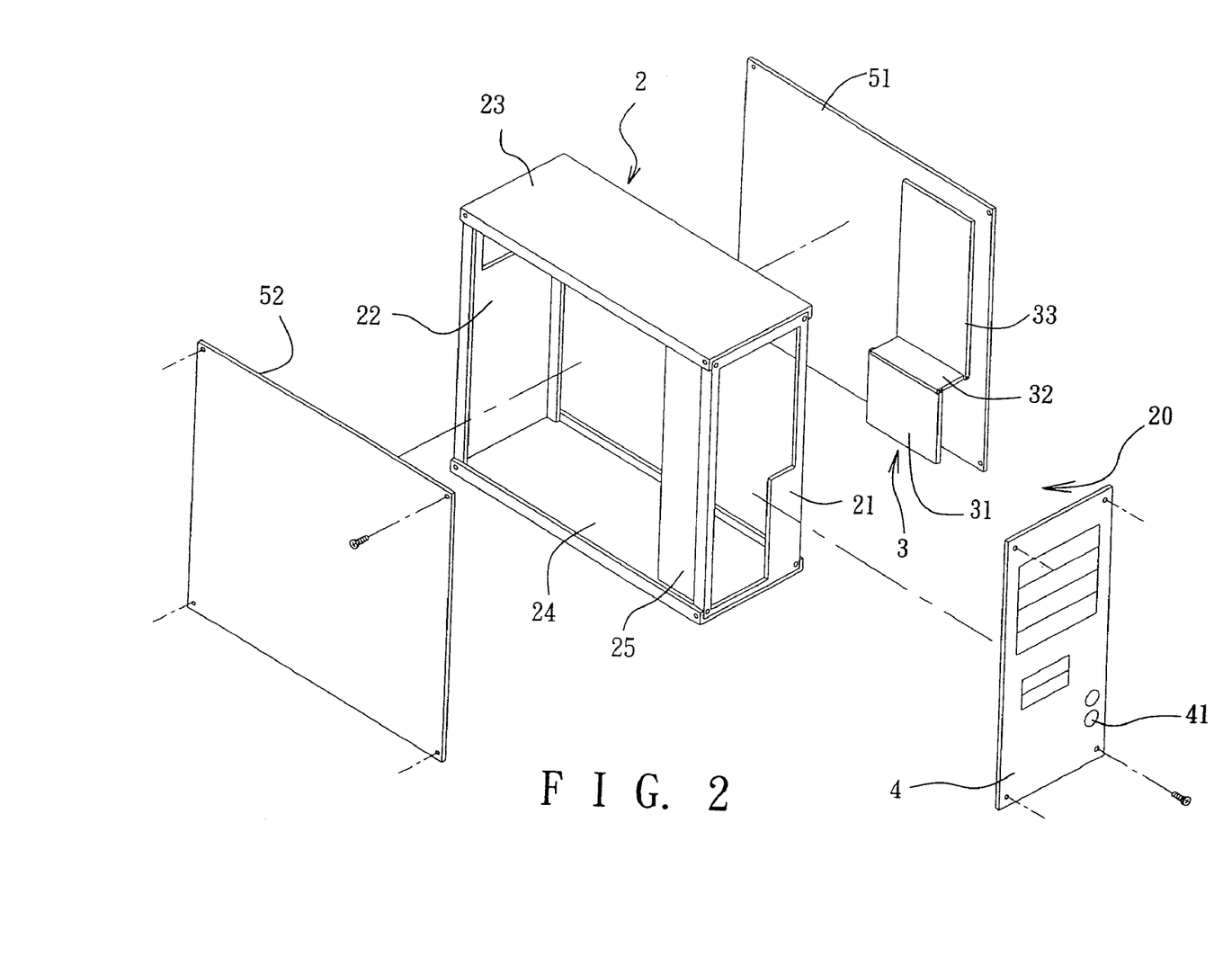
FIG. 2 is an exploded view to illustrate the first preferred embodiment of a computer housing according to the present invention, the computer housing including a frame, a face panel and two side panels, the frame including pivotally interconnected front, rear, upper, and lower housing panels.
Figure 3:
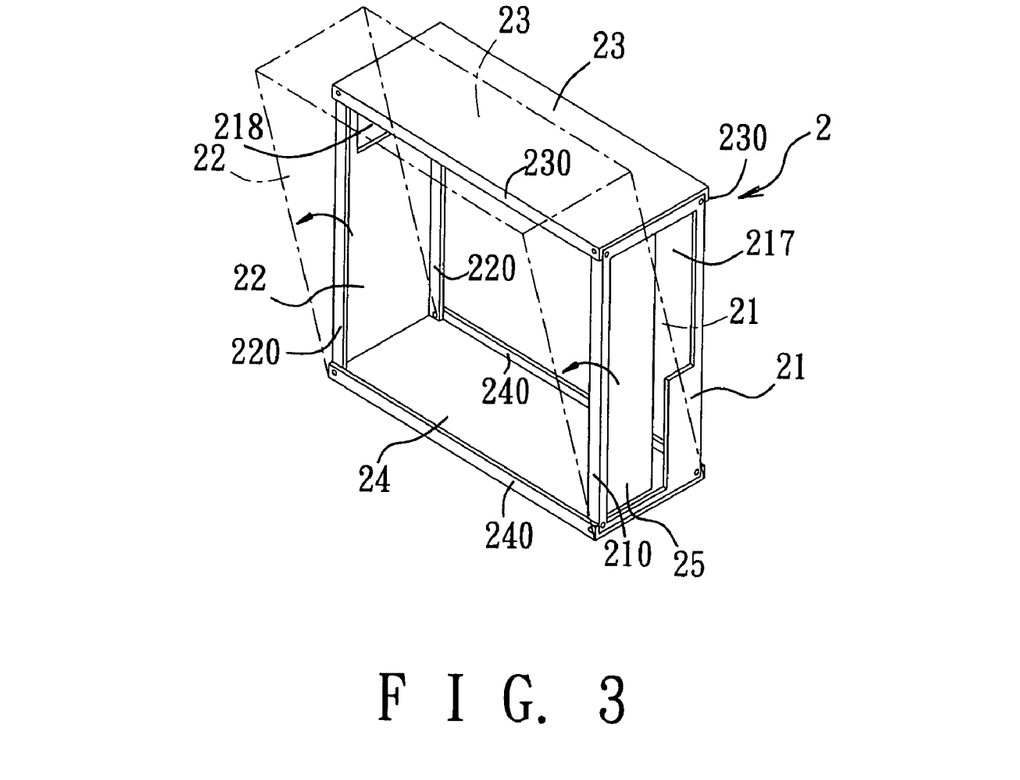
FIG. 3 is a perspective view to illustrate the direction in which the frame of the first preferred embodiment can be folded.

Referring to FIGS. 2 and 3, the first preferred embodiment of a computer housing 20 according to the present invention is shown to include a frame 2, a disk drive support frame 3, a face panel 4, and two side panels 51, 52.

The frame 2 includes two first housing panels 21, 22, two second housing panels 23, 24, and a supporting side plate 25. The two first housing panels 21, 22 are spaced apart from each other in a front-and-rear relationship. The two second housing panels 23, 24 are spaced apart from each other in an up-and-down relationship, and have front and rear panel ends connected pivotally and respectively to top and bottom panel ends of the two first housing panels 21, 22 so as to form a rectangular frame.

In this embodiment, two lateral edges of each housing panel 21, 22, 23, 24 are bent in the same direction to form bent portions 210, 220, 230, 240. Pivotal connections among the housing panels 21, 22, 23, 24 are achieved by pivotally connecting top and bottom ends of the bent portions 210, 220 of the two first housing panels 21, 22 to front and rear ends of the bent portions 230, 240 of the two second housing panels 23, 24, respectively, thereby forming the rectangular frame. Since the housing panels 21, 22, 23, 24 are pivotally connected, the two first housing panels 21, 22 (the two second housing panels 23, 24) can pivotally rotate relative to the two second housing panels 23, 24 (the two first housing panels 21, 22) between an assembled state and a folded state.

When the frame 2 is disposed in the assembled state (as shown in FIG. 3), the two first housing panels 21, 22 are spacedly parallel to each other in a front-and-rear relationship (and are hereinafter referred to as front and rear housing panels 21, 22 to facilitate description), and the two second housing panels 23, 24 are spacedly parallel to each other in an up-and-down relationship (and are hereinafter referred to as upper and lower housing panels 23, 24 to facilitate description). The front and rear housing panels 21, 22 are both perpendicular to the upper and lower housing panels 23, 24. Therefore, the front and rear housing panels 21, 22 define front and rear sides of the frame 2, and the upper and lower housing panels 23, 24 define top and bottom sides of the frame 2. The front housing panel 21 is provided with a front opening 217. An upper half portion of the opening 217 is wider than a lower half portion thereof. The rear housing panel 22 is provided with a rectangular opening 218 adjacent to a top edge thereof. As shown in FIG. 2, the face panel 4 can be assembled at the front side of the frame 2 to thereby form a control face panel of the computer housing 20. Besides, the face panel 4 is provided with a switch button 41. The two side panels 51, 52 are disposed to be provided on left and right sides of the frame 2 (and are hereinafter referred to as left and right side panels 51, 52 so as to facilitate description of the disk drive support frame 3).

Figure 4:
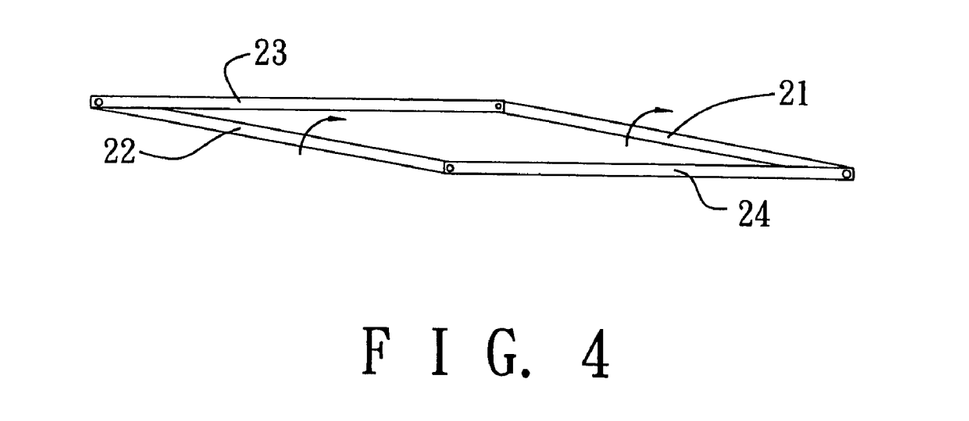
FIG. 4 is a side view to illustrate the state of the frame during the folding process.

Referring to FIGS. 2, 3 and 4, when it is desired to convert the frame 2 from the assembled state to the folded state, the front and rear housing panels 21, 22 are pivotally turned rearward relative to the lower housing panel 24 and collapsed, thereby bringing the upper housing panel 23 to fall rearward to convert the frame 2 to the folded state, as best shown in FIG. 4. The front housing panel 21 is pivotally turned to be proximate to an upper side of the lower housing panel 24, whereas the rear housing panel 22 falls rearward to be rearwardly of the lower housing panel 24 and to be proximate to the upper housing panel 23. The upper and lower housing panels 23, 24 are also brought to be closer to each other. At this time, compared with the assembled state shown in FIG. 2, the entire frame 2 is substantially flat, and the heightwise dimension is considerably decreased, so that the space occupied by the entire frame 2 can be reduced.

The supporting side plate 25 and the disk drive support frame 3 are provided respectively on two lateral sides of the frame 2. In this embodiment, the supporting side plate 25 is connected pivotally to the right lateral edge of the front housing panel 21, and the disk drive support frame 3 is provided on one of the side panels 51 (i.e., the left side panel 51). The disk drive support frame 3 includes a supporting plate 31, a pivot connection plate 32, and a housing connecting plate 33. The housing connecting plate 33 and the supporting plate 31 extend in a vertical direction, and are spaced apart from each other. The pivot connection plate 32 extends in a horizontal direction, and has two opposite plate edges connected pivotally and respectively to a bottom edge of the housing connecting plate 33 and a top edge of the supporting plate 31. Moreover, the disk drive support frame 3 is secured to one side panel surface of the left side panel 51 facing the frame 2 through the housing connecting plate 33.

When the frame 2 is disposed in the assembled state, the supporting side plate 25 can be turned pivotally to face in the direction of the rear housing panel 22 (as shown in FIG. 3). At the same time, the two side panels 51, 52 are mounted respectively to two sides of the frame 2 using screws (or by snug engagement) so that the disk drive support frame 3 is disposed within the frame 2, with the supporting plate 31 parallel to the left side panel 51 in a spaced-apart relationship. At this time, a horizontal spacing (corresponding to the lower half portion of the front opening 217 in the front housing panel 21) between the supporting plate 31 and the supporting side plate 25 is narrower than a horizontal spacing (corresponding to the upper half portion of the front opening 217 in the front housing panel 21) between the housing connecting plate 33 and the supporting side plate 25, thereby permitting mounting of a 3.5" floppy disk drive (not shown) using screws (or by any other means of engagement). An optical disk drive (not shown), or any other electronic hardware devices with the same width as the optical disk drive, can be mounted between the housing connecting plate 33 and the supporting side plate 25 by locking (or by any other means of engagement). The rectangular opening 218 in the rear housing panel 22 is provided to expose a power supply (not shown) disposed in the frame 2 for connection to an external power source.

Certainly, prior to folding the frame 2 into the folded state, it is necessary to remove the two side panels 51, 52 from the frame 2 and then pivotally turn the supporting side plate 25 to rest against a rear side of the front housing panel 21 (as shown in FIG. 3). Thereafter, the operation of folding the frame 2 (see FIGS. 3 and 4) can be conducted.

On the contrary, when it is desired to convert the frame 2 from the folded state to the assembled state, the front and rear housing panels 21, 22 are turned pivotally upward in a direction indicated by the arrows in FIG. 4 to be in a standing state as shown in FIG. 3. Then the supporting side plate 25 is turned rearward toward the rear housing panel 22. The two side panels 51, 52 and the face panel 4 are subsequently mounted at the two lateral sides and the front side of the frame, respectively. Thus, assembly of the entire computer housing 20 is completed.

Figure 5:
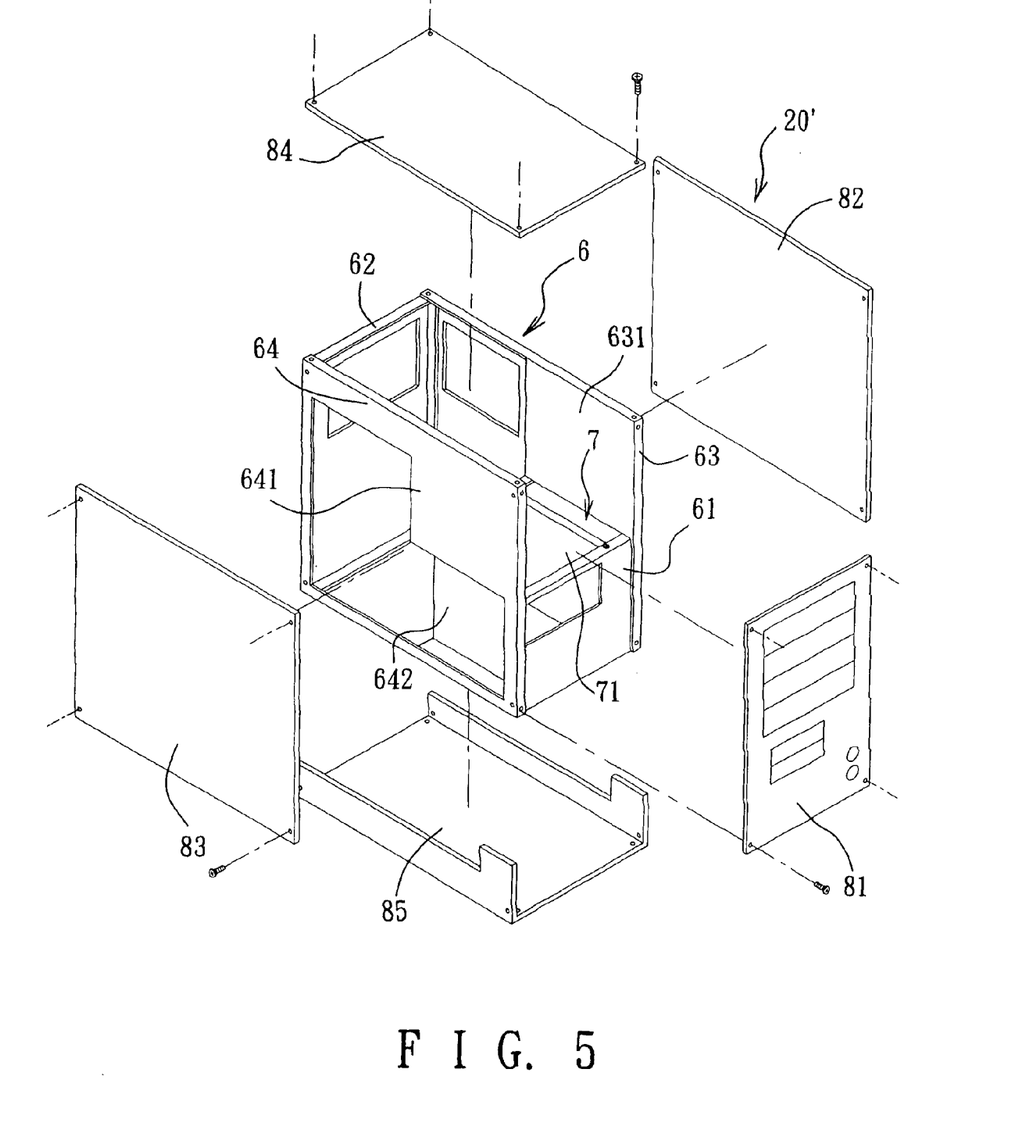
FIG. 5 is an exploded view to illustrate the second preferred embodiment of a computer housing according to the present invention, the computer housing including a frame, a disk drive support frame, a face panel, and two side panels, the frame including pivotally interconnected front, rear, left, and right housing panels.
Figure 6:
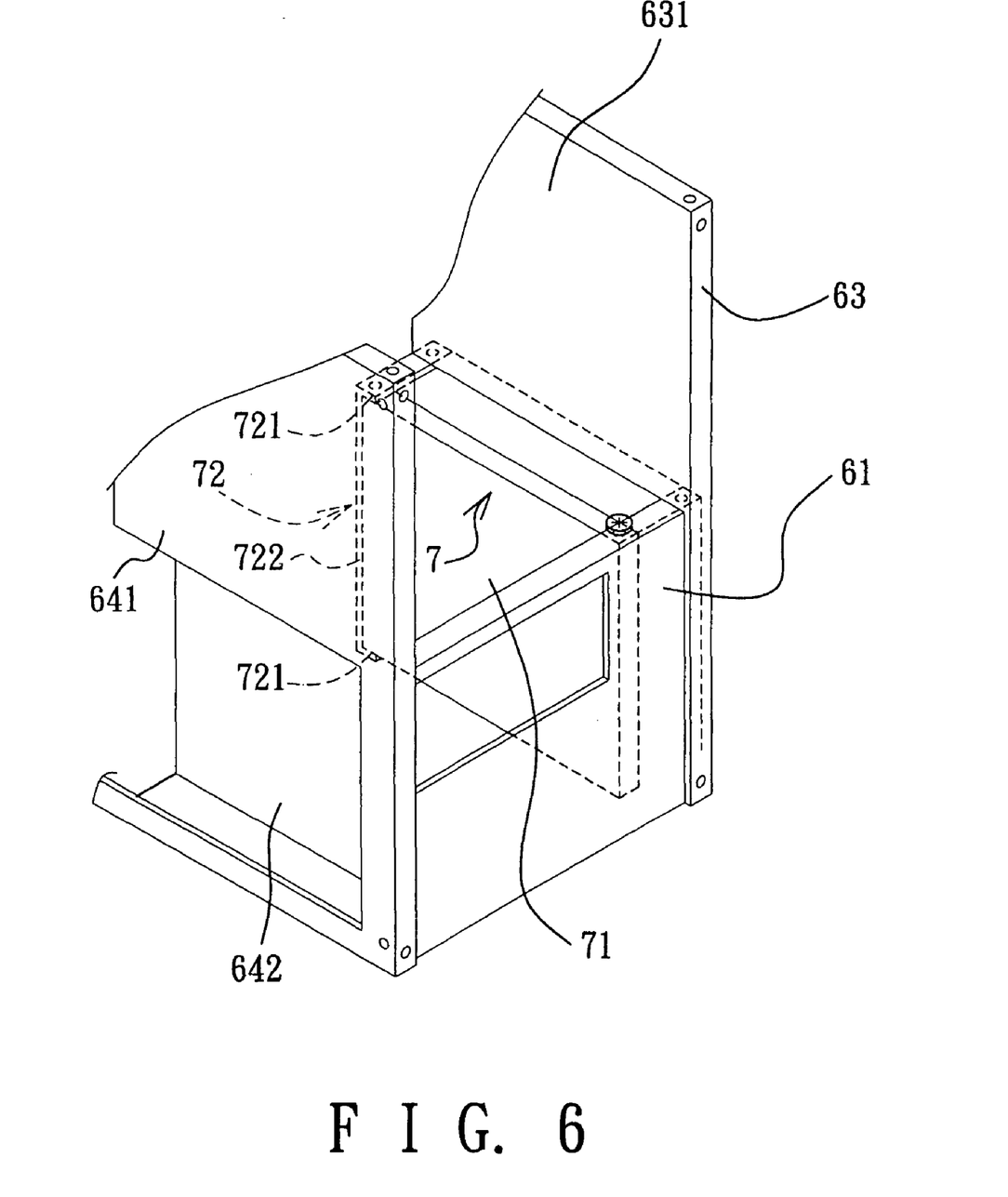
FIG. 6 is a fragmentary enlarged view to illustrate the disk drive support frame of the second preferred embodiment, which has a supporting plate and a pivot connection plate.
Figure 7:
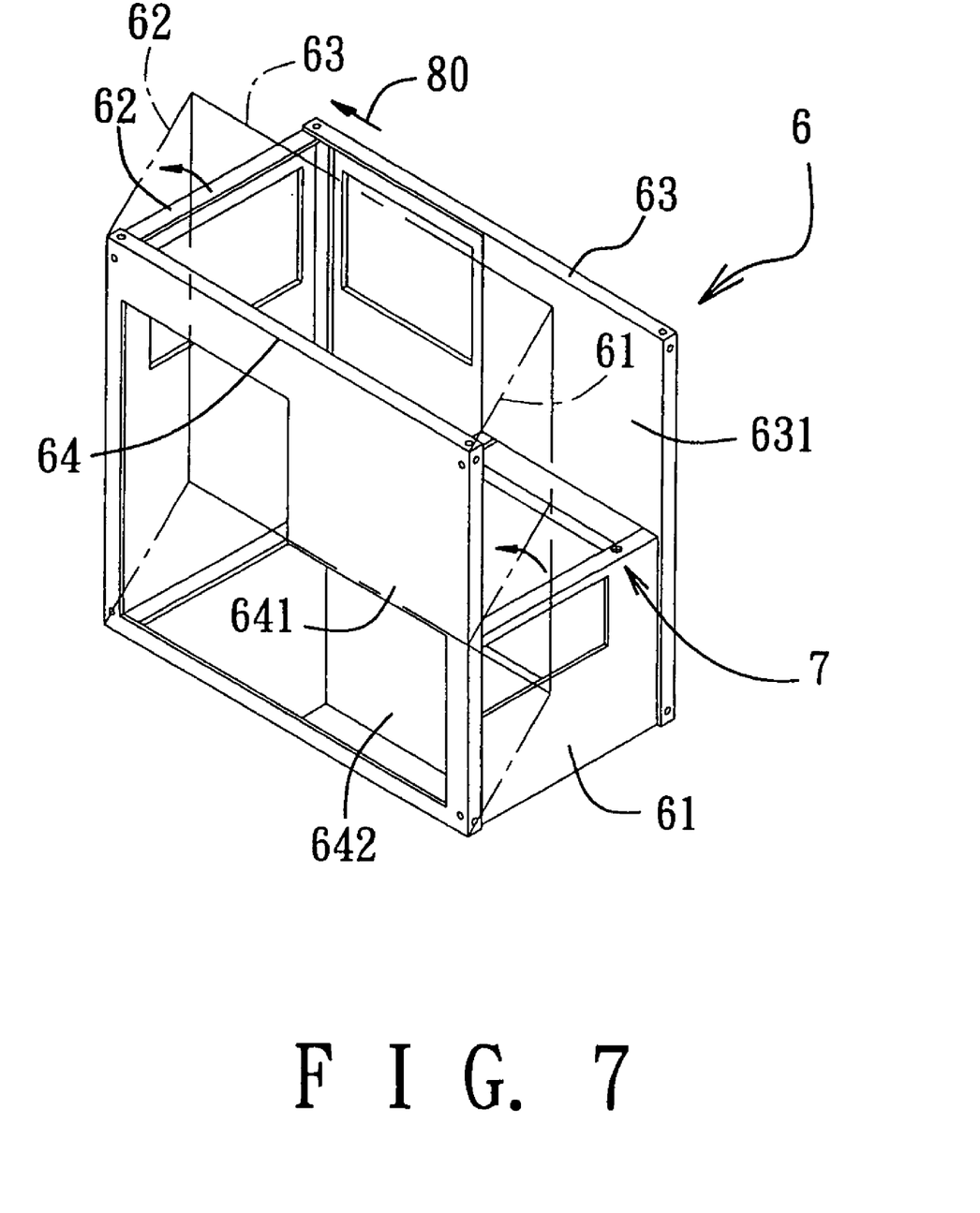
FIG. 7 is a perspective view to illustrate the direction in which the frame of the second preferred embodiment can be folded.

Referring to FIGS. 5, 6 and 7, the second preferred embodiment of a computer housing 20' according to the present invention is shown to include a frame 6, a disk drive support frame 7, a face panel 81, two side panels 82, 83, an upper cover 84, and a base 85.

The frame 6 likewise includes two first housing panels 61, 62 and two second housing panels 63, 64. The two first housing panels 61, 62 are spaced apart in a front-and-rear relationship to define the front and rear sides of the frame 6 (and are hereinafter referred to as front and rear housing panels 61, 62 to facilitate description). The two second housing panels 63, 64 are spaced apart in a left-and-right relationship to define left and right sides of the frame 6 (and are hereinafter referred to as left and right housing panels 63, 64 to facilitate description). Left and right lateral panel ends of the front and rear housing panels 61, 62 are connected pivotally and respectively to inner sides of front and rear panel ends of the left and right housing panels 63, 64. The manner of pivotal connection is substantially the same as that used in the first preferred embodiment, and is not discussed further herein for the sake of brevity. The four housing panels, 61, 62, 63, 64 are interconnected to form a rectangular frame, and the frame 6 is convertible between an assembled state and a folded state, which will be described in detail below.

In this embodiment, the height of the front housing panel 61 is approximately half of that of the rear housing panel 62. Therefore, the front housing panel 61 is connected only to lower half portions of the left and right housing panels 63, 64. However, in practice, the height of the front housing panel 61 should not be limited thereto. The left and right housing panels 63, 64 have respective upper corner panel portions 631, 641 disposed at respective upper front corners thereof and corresponding to each other. The right housing panel 64 further has a lower corner panel portion 642 that is disposed below the upper corner panel portion 641 and that is recessed inwardly of the frame 6 relative to the upper corner panel portion 641.

Referring to FIGS. 5, 6, and 7, the disk drive support frame 7 includes a supporting plate 71 and a pivot connection plate 72. The pivot connection plate 72 has an upright connecting portion 722 and two pivotal portions 721 that are bent respectively in the same direction from upper and lower ends of the connecting portion 722 such that the pivot connection plate 72 has a substantially U-shaped cross-section. A front edge of the supporting plate 71 has two ends thereof connected pivotally to a rear side of the front housing panel 61 in an upstanding manner, and is disposed adjacent to the left edge of the front housing panel 61. Each of the two pivotal portions 721 of the pivot connection plate 72 has one end connected pivotally to a rear end of a top (or bottom) edge of the supporting plate 71, with the other end connected pivotally to the left housing panel 63 such that the entire disk drive support frame 7 is located below the upper corner panel portion 631 of the left housing panel 63.

Referring to FIGS. 5 and 6, when the frame 6 is disposed in the assembled state, the two first housing panels 61, 62 are spacedly parallel to each other in a front-and-rear relationship, and the two second housing panels 63, 64 are spacedly parallel to each other in a left-and-right relationship, and are connected perpendicularly to the front and rear housing panels 61, 62 to form the rectangular frame. At this time, a U-shaped opening of the pivot connection plate 72 of the disk drive support frame 7 which has a substantially U-shaped cross-section is oriented toward the front housing panel 61, and the supporting plate 71 is spaced apart from the left housing panel 63 and corresponds to the lower corner panel portion 642 of the right housing panel 64. The width between the lower corner panel portion 642 and the supporting plate 71 is narrower than that between the two upper corner panel portions 631, 641 at the left and right sides. A 3.5" floppy disk drive (not shown) can be provided in the space between the lower corner panel portion 642 and the supporting plate 71 by locking (or any other means of engagement). An optical disk drive (not shown) or any other electronic hardware devices with the same width as the optical disk drive can be provided in the space between the two upper corner panel portions 631, 641.

The face panel 81, the two side panels 82, 83, the upper cover 84, and the base 85 are respectively assembled to the front side, the left and right sides, and the upper and lower sides of the frame 6 to thereby form a complete computer housing 20'.

Figure 8:
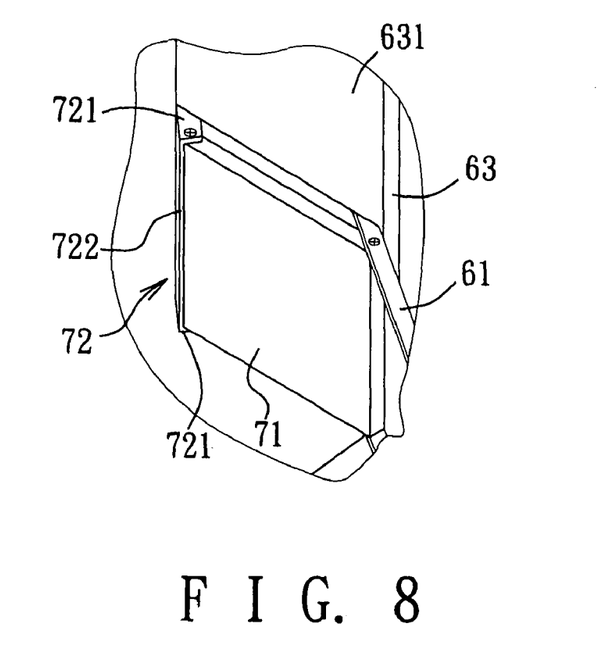
FIG. 8 is a fragmentary enlarged view to illustrate the state of the disk drive support frame of the second preferred embodiment when the frame is being folded.
Figure 9:
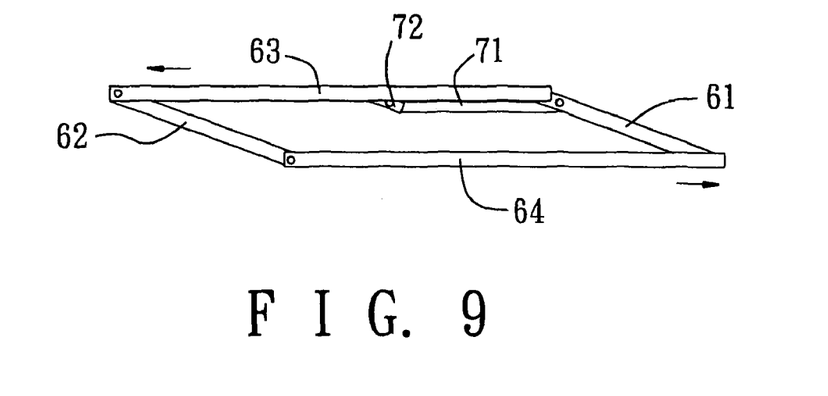
FIG. 9 is a schematic top view to illustrate the state of the frame of the second preferred embodiment during the folding process.

Referring to FIGS. 7, 8 and 9, when it is desired to fold the frame 6 from the assembled state to the folded state, a force is first applied to the left housing panel 63 to cause the left housing panel 63 to move rearward relative to the right housing panel 64 (as indicated by the arrow 80 in FIG. 7), thereby bringing the front and rear housing panels 61, 62 to pivotally turn rearward relative to the right housing panel 64. At the same time, the left housing panel 63 is also brought to approach in the direction of the right housing panel 64, as shown in FIG. 9. When the frame 6 is placed in the folded state, the front housing panel 61 and the left housing panel 63 are flattened out, and the right housing panel 64 and the rear housing panel 62 are also flattened out, with the front housing panel 61 pivotally turned to approach the right housing panel 64, and with the left housing panel 63 pivotally turned to approach the rear housing panel 62. At the same time, the left and right housing panels 63, 64 are brought to be closer to each other. As for the disk drive support frame 7, referring to FIGS. 8 and 9, since the front housing panel 61 and the left housing panel 63 are flattened out, the front edge of the supporting plate 71 is subjected to the pulling force of the front housing panel 61 and is caused to move slightly forward to be proximate to and to rest against a lower portion of the left housing panel 63 opposite to the upper corner panel portion 631. At the same time, the pivot connection plate 72 is also turned pivotally so that the U-shaped opening thereof which was oriented to the front housing panel 61 is now oriented toward the left housing panel 63. When the frame 6 is placed in the folded state, the disk drive support frame 7 will be sandwiched between the flattened-out front and left housing panels 61, 63 and the rear and right housing panels 62, 64.

Accordingly, compared with the frame 6 in the assembled state, the frame 6 in the folded state has a reduced size in the widthwise direction, thereby reducing the space for placement of the frame 6. It is noted that, in the first preferred embodiment, while the front and rear housing panels 21, 22 are collapsed by pivotally turning the same rearward so as to fold up the frame 2, the front and rear housing panels 21, 22 can also be designed to collapse forward so as to fold up the frame 2. Similarly, in the second preferred embodiment, the folding of the frame 6 can be modified to have the left housing panel 63 move forward so as to bring the front and rear housing panels 61, 62 to collapse forward so as to be folded up. In addition, the corners of the aforesaid housing panels can also be provided with other engaging or positioning mechanisms (not shown) to fix the frame 2, 6 in position when the same is in the assembled state so that the frame 2, 6 will not be undesirably collapsed.

In sum, by means of the pivotally interconnected housing panels, the computer housing 20, 20' according to the present invention permits folding of the frame 2, 6 prior to delivery to the user end or when the user dismantles the computer housing 20, 20' so as to reduce the overall size of the frame 2, 6 for saving space during transport, displaying, and storage. For the manufacturer, costs associated with transport and packaging can also be reduced to thereby increase profit margins. Moreover, the user only needs to do some simple operations to unfold the frame 2, 6 into the rectangular frame in the assembled state after purchase, thereby facilitating assembly.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A foldable frame for a computer housing, comprising: two parallel first housing panels; and
two parallel second housing panels, each of said second housing panels having two ends connected pivotally and respectively to said first housing panels such that said second housing panels and said first housing panels are spaced apart from each other and are interconnected surroundingly;
said frame being pivotable and convertible between an assembled state, where said first housing panels and said second housing panels form a rectangular frame, and a folded state, where one of said first housing panels is turned pivotally to be proximate to one of said second housing panels, while the other of said first housing panels is turned pivotally to be proximate to the other of said second housing panels;
wherein said first housing panels are spaced apart in a front-and-rear relationship to define front and rear sides of said frame, and said second housing panels are spaced apart in an up-and-down relationship to define top and bottom sides of said frame, said first housing panels having top and bottom panel ends connected pivotally and respectively to front and rear panel ends of said second housing panels to thereby form said rectangular frame;
said foldable frame further comprising:
a face panel disposed at a front side of said frame;
two side panels disposed on two lateral sides of said frame, respectively; and
a disk drive support frame having a supporting plate and a pivot connection plate, said pivot connection plate having two opposite plate edges connected pivotally and respectively to an inner panel surface of one of said side panels and said supporting plate such that said supporting plate is movable so as to be close to and rest against said one of said side panels or to be spacedly parallel thereto.

2. The foldable frame for a computer housing according to claim 1, further comprising a supporting side plate, said disk drive support frame and said supporting side plate being provided respectively or two sides of said frame so as to be adapted for mounting of one of an optical disk drive and a floppy disk drive between said disk drive support frame and said supporting side plate.

3. The foldable frame for a computer housing according to claim 1, further comprising a supporting side plate connected pivotally to said first housing panel which defines said front side of said frame, said supporting side plate and said supporting plate being respectively located at both sides of said frame when said frame is disposed in the assembled state so as to be adapted for mounting of one of an optical disk drive and a floppy disk drive between said supporting side plate and said supporting plate.

4. A computer housing comprising:
a frame including two parallel first housing panels, and two parallel second housing panels, each of said second housing panels having two ends connected pivotally and respectively to said first housing panels such that said second housing panels and said first housing panels are spaced apart from each other and are interconnected surroundingly,
said frame being pivotable and convertible between an assembled state, where said first housing panels and said second housing panels form a rectangular frame, and a folded state, where one of said first housing panels is turned pivotally to be proximate to one of said second housing panels, while the other of said first housing panels is turned pivotally to be proximate to the other of said second housing panels;
a face panel disposed at a front side of said frame;
two side panels that are disposed respectively on two lateral sides of said frame when said frame is in the assembled state;
wherein said first housing panels are spaced apart in a front-and-rear relationship to define front and rear sides of said frame, and said second housing panels are spaced apart in an up-and-down relationship to define top and bottom sides of said frame, said first housing panels having top and bottom panel ends connected pivotally and respectively to front and rear panel ends of said second housing panels to thereby form said rectangular frame; and
a disk drive support frame having a supporting plate and a pivot connection plate, said pivot connection plate having two opposite plate edges connected pivotally and respectively to an inner panel surface of one of said side panels and said supporting plate such that said supporting plate is movable so as to be close to and rest against said one of said side panels or to be spacedly parallel thereto.

5. The computer housing according to claim 4, further comprising a supporting side plate, said disk drive support frame and said supporting side plate being provided respectively on two sides of said frame so as to be adapted for mounting of one of an optical disk drive and a floppy disk drive between said disk drive support frame and said supporting side plate.

6. The computer housing according to claim 4, wherein said frame further includes a supporting side plate, said supporting side plate being connected pivotally to said first housing panel which defines said front side of said frame, said supporting side plate and said supporting plate being respectively located at both sides of said frame when said frame is disposed in the assembled state so as to be adapted for mounting one of an optical disk drive and a floppy disk drive between said supporting side plate and said supporting plate.

* * * * *